United States Patent
Chang et al.

(10) Patent No.: US 7,990,962 B2
(45) Date of Patent: Aug. 2, 2011

(54) DATA DISTRIBUTION APPARATUS AND METHOD

(75) Inventors: Sophie Chang, London (GB); Mick Saxton, London (GB); Garth Howell, London (GB)

(73) Assignee: 1E Limited, London (GB)

( * ) Notice: Subject to any disclaimer, the term of this patent is extended or adjusted under 35 U.S.C. 154(b) by 423 days.

(21) Appl. No.: 12/073,202

(22) Filed: Mar. 3, 2008

(65) Prior Publication Data
US 2008/0155088 A1    Jun. 26, 2008

Related U.S. Application Data

(63) Continuation of application No. 11/035,022, filed on Jan. 14, 2005, now Pat. No. 7,362,758.

(51) Int. Cl.
*H04L 12/28* (2006.01)
(52) U.S. Cl. ........ 370/390; 370/432; 370/400; 717/177; 717/178
(58) Field of Classification Search .......... None
See application file for complete search history.

(56) References Cited

U.S. PATENT DOCUMENTS

| | | | | |
|---|---|---|---|---|
| 6,966,059 B1 * | 11/2005 | Shetty et al. | .................. | 717/172 |
| 7,362,758 B2 * | 4/2008 | Chang et al. | .................. | 370/390 |
| 2003/0106066 A1 * | 6/2003 | Sakai | ............................ | 725/105 |
| 2003/0108030 A1 | 6/2003 | Gao | | |
| 2003/0233594 A1 * | 12/2003 | Earl | ................................. | 714/4 |
| 2004/0218602 A1 * | 11/2004 | Hrastar | ........................ | 370/390 |
| 2005/0111453 A1 | 5/2005 | Mizutani | | |

OTHER PUBLICATIONS

"1E Technical Whitepaper, SMSNomad Branch", Implementing SMS 2003 in Branch Office Environments, 2004, 7 pages.

* cited by examiner

*Primary Examiner* — Duc C Ho
(74) *Attorney, Agent, or Firm* — Baker & Hostetler LLP

(57) ABSTRACT

A systems management computer is provided, and comprises a processor configured to execute a set of stored instructions that implements a method for receiving data from a server over a first network and for distributing the data to a plurality of computers over a different second network. One instruction is for electing a computer from said plurality of computers of the second network to act as an active download master. Another instruction operates if the computer is elected as the active download master computer and initiates downloading of data over the first network to local data storage. A further instruction operates if the computer is elected as the active download master computer and multicasts, by a multicast distribution engine, the downloaded data over the second network to other computers of the second network.

30 Claims, 4 Drawing Sheets

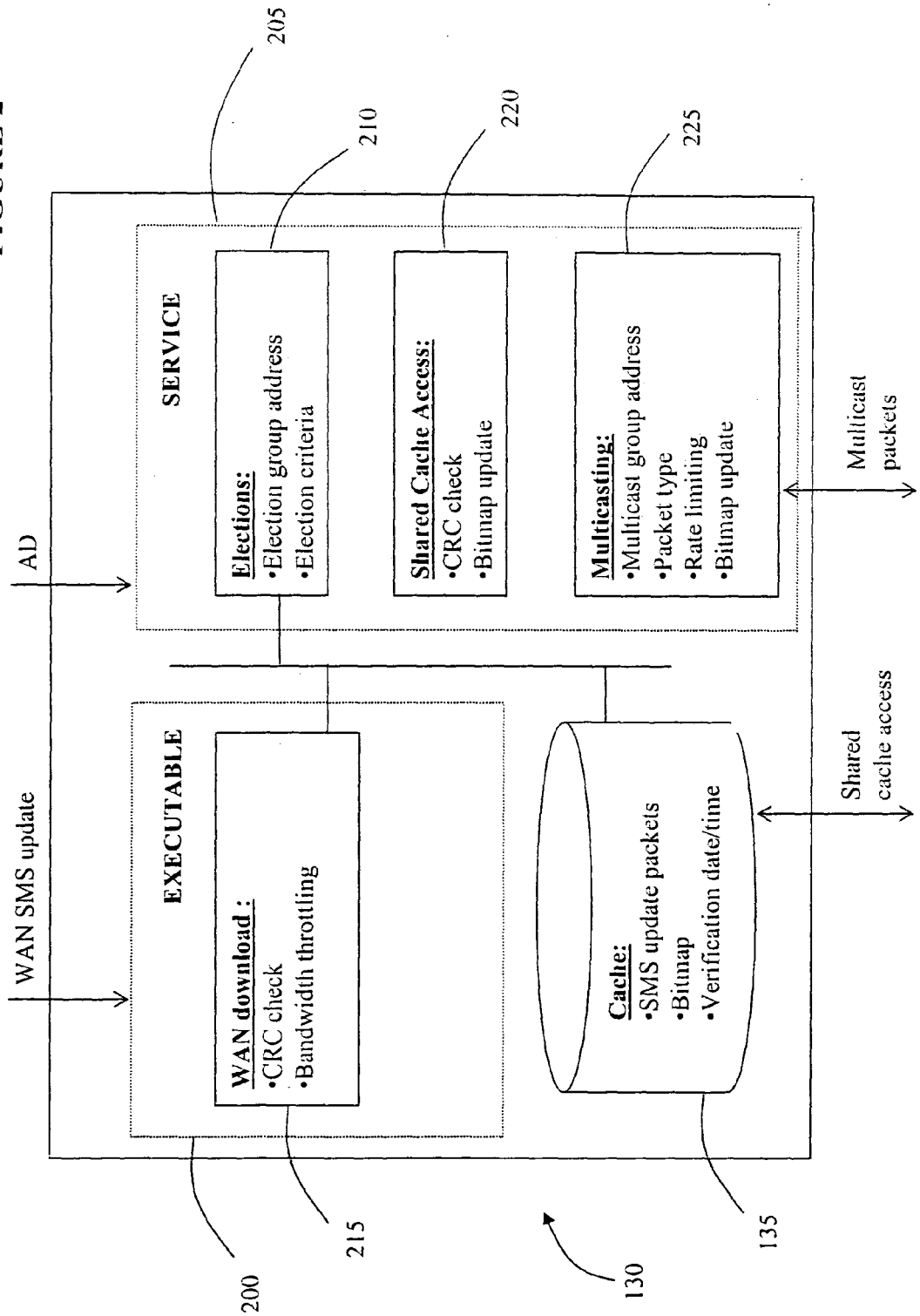

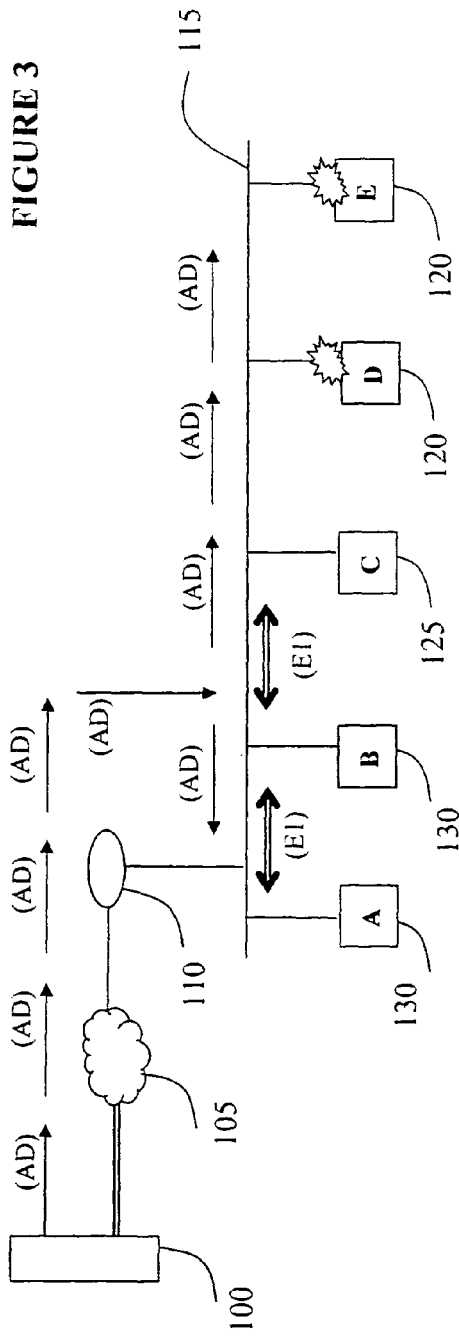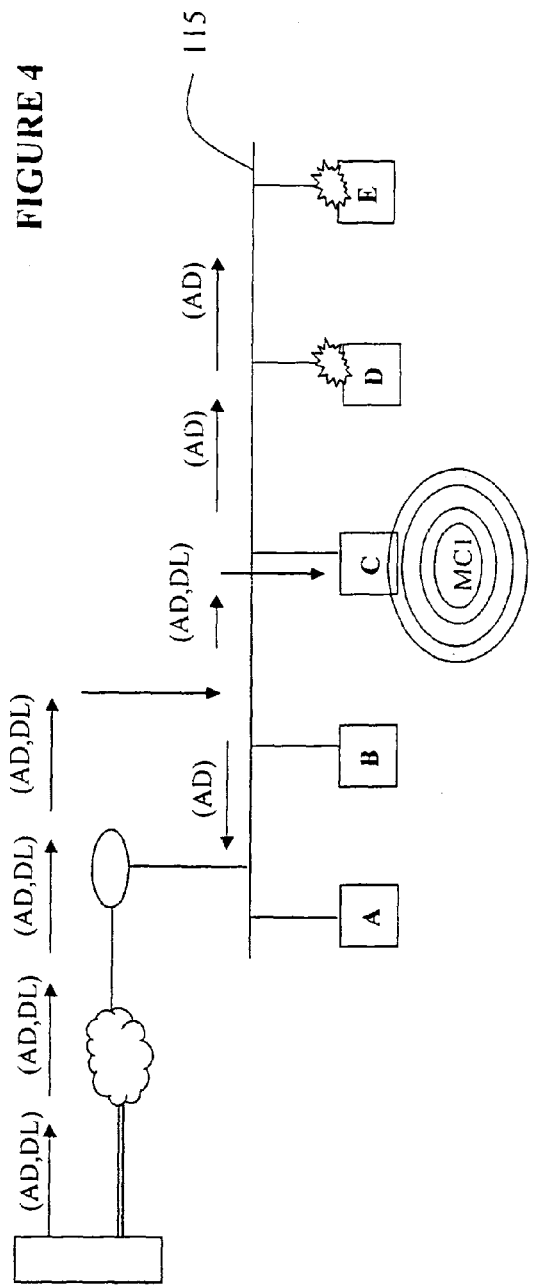

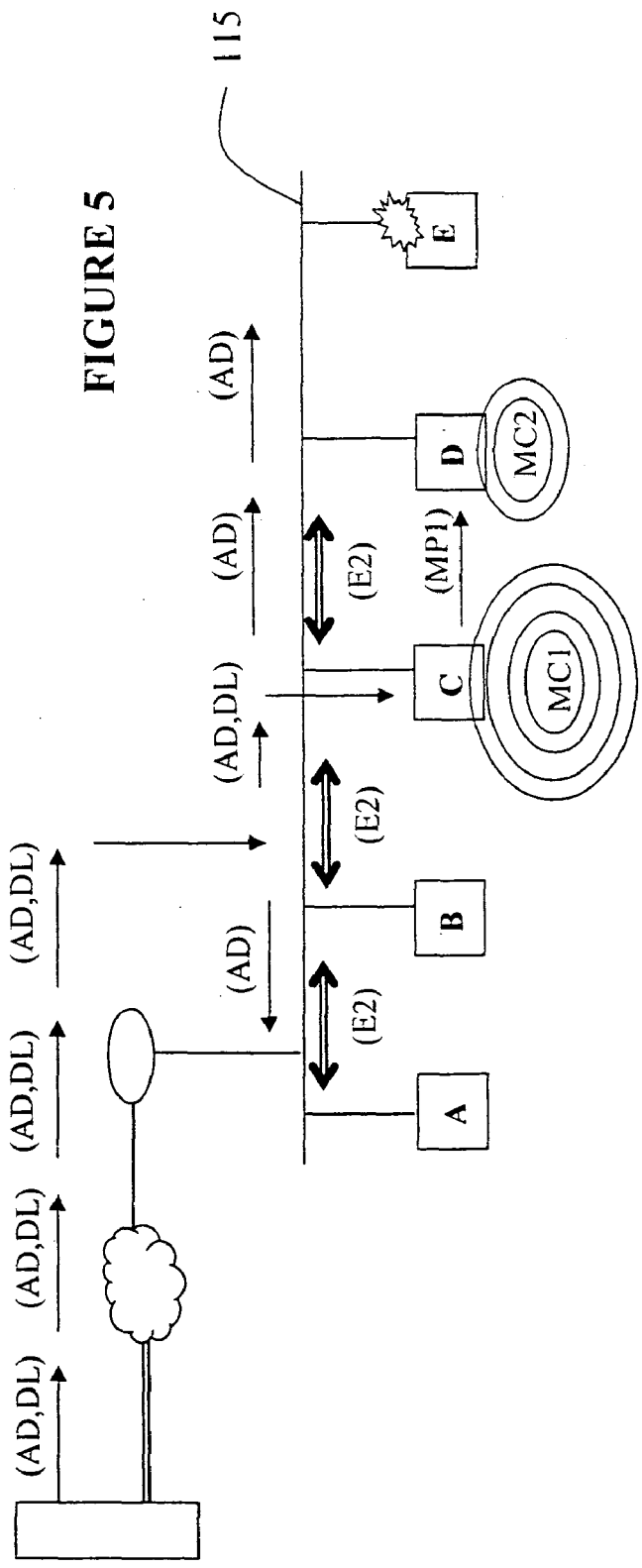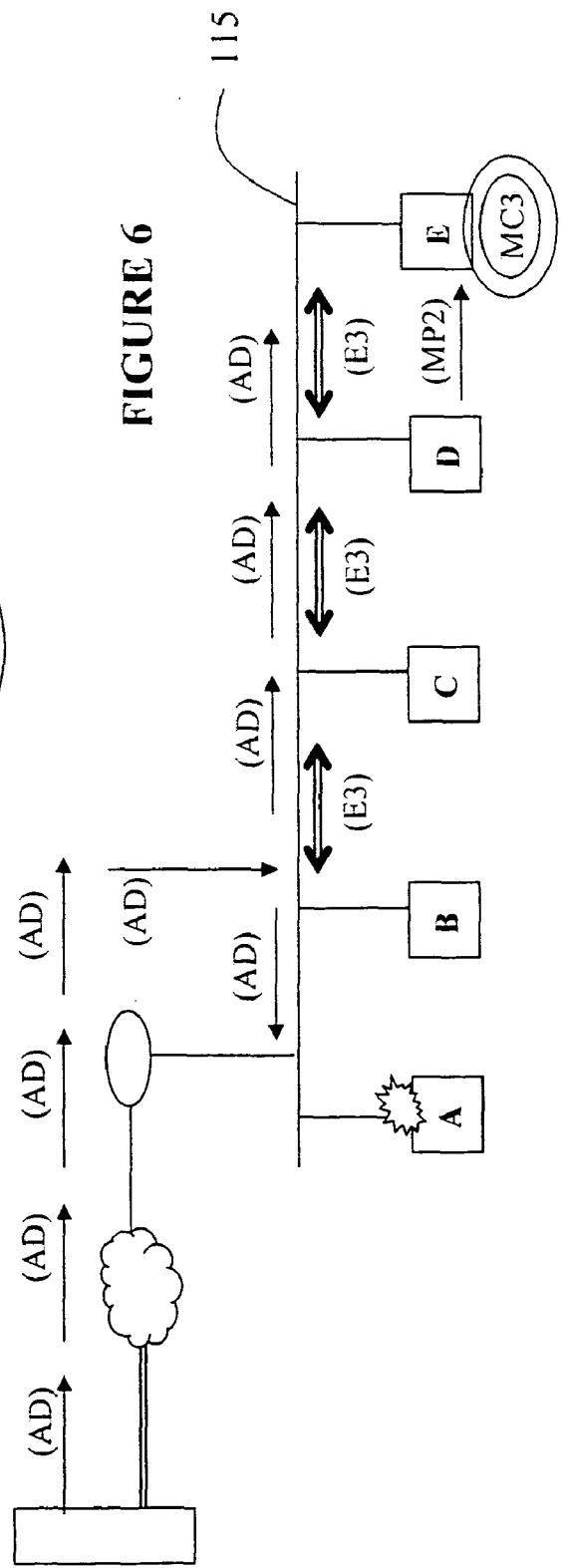

DATA DISTRIBUTION APPARATUS AND METHOD

CROSS REFERENCE TO RELATED APPLICATIONS

This application is a continuation of U.S. application Ser. No. 11/035,022 filed Jan. 14, 2005, the content of which is hereby incorporated herein by reference in this application.

FIELD OF THE INVENTION

The present invention relates to data distribution apparatus and to a method of systems management. It finds particular application in delivering software and/or data to multiple sites such as terminals.

BACKGROUND OF THE INVENTION

Large organisations often have several geographically separate branch sites which each have multiple machines connected across their own local network such as a Local Area Network ("LAN"). These machines are coordinated from a central or controlling location, across a larger network such as a Wide Area Network ("WAN"). As part of the systems management, software and data have to be delivered to the multiple machines at the branch sites across the larger network.

Microsoft™ SMS™ (Systems Management Server) is a known systems management solution, managing networks and software using a hierarchical mechanism that is controlled from one or more central sites. This has worked well where the branch sites are connected to a central site using permanent high bandwidth connections but has been less than ideal for branch sites with low bandwidth connections and/or mobile users with intermittent connections. This is mainly due to the fact that, in the absence of external control, multiple machines at one branch site will independently try to download new material from a central site at the same time, thereby putting a heavy load on the larger network. Meanwhile, for those users with intermittent connections, the download of data typically has to be repeatedly restarted.

Microsoft™ have developed a system called Background Intelligent Transfer Service ("BITS") which, in the case of interrupted file transfers, allows for transfer of a file to be picked up from where it was left off, which helps mitigate the intermittent connection problem. BITS can also throttle network traffic based on a local network card's bandwidth consumption. However, the throttling works at the level of the individual machines and does not deal effectively with the high combined load of all the machines trying to download material from the central site at the same time.

It is an option to install servers at the branch sites and to download new software and data to these local servers which would then make the updates available locally. This reduces the load on the larger network but is an expensive solution since the local servers demand new hardware and involve implementation, management and maintenance costs.

It is possible instead to use one of the local machines effectively as a server, downloading updates to shared data storage on that "server" machine and then letting the other branch machines obtain their updates from it over the local network. However, this is likely to degrade the performance of the machine being used as a "server" quite significantly. All the local machines will be used for other purposes and the additional workload when having to service multiple requests from other machines for copies can easily slow down the "server" to an unacceptable level. This has been ameliorated to some extent by a product known as SMSNomad Branch, in which local machines elect one of themselves in real time to act as the "server", but this still means a significant additional workload for the elected machine.

SMSNomad Branch is a known product of 1E Ltd and information about the product is available from 1E Ltd, for example on the Website www.1e.com or by contacting 1E at CP House, 97-107 Uxbridge Road, W5 5TL, London, United Kingdom.

SUMMARY OF THE INVENTION

According to a first aspect of embodiments of the present invention, there is provided data distribution apparatus, for use on each of a plurality of machines in distributing a set of data over a network amongst said machines, which apparatus comprises:
i) multicast apparatus for use in multicasting said set of data over the network for receipt by others of said machines; and
ii) a data retrieval arrangement for use in retrieving data from a set of data previously multicast by at least one of said machines, and supplying retrieved data to the multicast apparatus for use in multicasting the retrieved data over the network to others of the plurality of machines;
whereby more than one of said plurality of machines is enabled to act as a multicast source in distributing the set of data over the network.

Data distribution apparatus according to this first aspect of the present invention can be used to great advantage to distribute data to branch machines over a local network where the data has been received over another network, as in the SMS scenario. Just one branch machine downloads the data (or "set of data") from an SMS distribution point, in the manner of SMSNomad Branch, and then acts as a local multicast source to transmit the data over the branch network to the other local machines. A multicast transmission puts much less load on the network than downloading the data in point-to-point transmissions to each branch machine.

If one of the local machines fails to receive all the data, whether it was because the multicast transmission was incomplete as sent or as received, that one local machine can recover the missing data and then act as a second multicast source to transmit the missing data over the branch network. This second multicast transmission will reach other machines that may have missed the same data and is a relatively efficient way of ensuring that at least the bulk of the data has reached the bulk of the branch machines. It also spreads the processing load in acting as source for multicasting the data over the branch network as more than one machine can act as source in delivering at least part of the set of data. That is, the first machine does not have to remulticast the missing data.

Reliable multicasting is a known technique for ensuring safe delivery of material by multicast and it would be possible to use reliable multicasting in embodiments of the present invention. However, it is not particularly appropriate for use in the SMS type of scenario. Firstly, reliable multicasting creates a significant overhead in processing and transmission capacity which the branch machines and local network may not have consistently available. Secondly, it would not deal with all the situations that can lead to incomplete distribution of software over a branch network. For example, a first branch machine to multicast a set of data over the local network might be switched off before a second machine is switched on. The second machine cannot in this circumstance obtain the set of data from the first machine even by reliable multicast.

It might be noted that material for download or multicasting might include software and/or content and this material is generally referred to herein as "data". Thus the term data is used herein to include not just content such as information but also software.

Clearly, the data recovery arrangement can be important in equipping a second machine to multicast data missing from a set of data involved in a transmission by a first machine. The missing data may be obtainable over the local network, for instance if another branch machine had already obtained a more complete set or by going back to the first machine, and this may be the preferred arrangement. For example, if the data distribution apparatus further comprises shared data storage for storing the set of data, then the set of data may be stored at the first machine in use and the second machine is able to access the set of data in the shared data storage. In the SMS scenario, the missing data may be available to the second machine by going back to the SMS distribution point and downloading it directly from there to the second machine.

Preferably the data recovery arrangement comprises a selection mechanism for selecting a source machine from a candidate set of machines from which the missing data may be recovered.

A suitable selection mechanism might comprise an elective process for electing a source machine from amongst candidate machines connected to the network, in the manner of SMSNomad Branch. The election criteria in an embodiment of the present invention might include one or more of the following:
i) completeness of the sets of data held by candidate machines for the election;
ii) up-to-dateness, or currency, of the sets of data held by candidate machines for the election; and
iii) whether a machine is already acting as a multicast source of the set of data.

Such a selection mechanism can be used in real time, allowing dynamic selection to be made in the light of current circumstances. Importantly, a machine requiring data recovery is not forced to go back to the first machine unless it is the machine selected according to the relevant criteria.

As mentioned above, it may be necessary to go beyond the local network to recover the data, for example back to a SMS distribution point. To deal with this, an option would be that the candidate set of machines may include at least one machine connected to the network via a further network. In the SMS scenario, the further network might be the "larger" network mentioned above, such as a WAN, and said at least one machine might be a machine already acting as SMS distribution point for download of data to the first machine.

In a preferred embodiment of the invention, the selection mechanism can be used to select the first machine, as well as for selecting a source machine for missing data.

According to a second aspect of embodiments of the present invention, there is provided systems management apparatus for receiving data over a first network and for distributing it to each of a plurality of machines over a second network, which apparatus comprises:
i) a selection mechanism for use in selecting a machine from said plurality;
ii) download apparatus for downloading data over the first network to data storage on a selected machine; and
iii) multicast distribution apparatus for use by the selected machine for multicasting downloaded data in a multicast stream over the second network.

In its second aspect, an embodiment of the invention can be loaded on each of a plurality of machines at a branch site and thus each machine is enabled to act as a "master" machine in downloading the data over a WAN (or other network) and distributing it at the branch site by local multicast.

Arrangements according to both the first and second aspects of embodiments of the invention can provide a very good solution to the problem of distributing software and/or data to machines at a branch site, and provide several advantageous features, including:
i) a selection mechanism allows existing machines to be used without any one machine having to be dedicated to the task of receiving and distributing the software and/or data. A real-time decision can be made, based on for example current availability;
ii) the software and/or data only has to be downloaded once over the first network. This keeps down traffic on the first network, which may be a WAN, between a central or controlling source and the branch site. It also reduces processing load on a server sending the download over the WAN;
iii) multicasting at the branch site is a very efficient distribution method to use at the local end where the machines may be in demand for all sorts of other uses. The selected machine simply multicasts the software and/or data over the local network and leaves the other machines to tap into the relevant group address;
iv) the system is scalable in that machines at the branch site can be added simply by loading client software to the machine and adding it to the group multicast address.

Additional machines add very little to the load on the local network or of the local selected "master" machine making a multicast delivery, except that there could be an increase in the number of requests for download completions amongst branch machines, followed by multicasting of the missing portions.

Individual features as described above may be used to advantage in either the first or second aspect of embodiments of the invention. This is particularly true, for example, of a data recovery arrangement. It is important in systems management that a download results in all the branch machines receiving the full download.

In a data recovery arrangement, embodiments of the invention can take advantage of the fact that when software and/or data are transferred, they are generally transferred in an ordered manner, such as in labelled blocks. A receiving machine can be equipped to keep a check on whether it has received everything by monitoring the labels of received blocks. If the transmission is incomplete, the receiving machine can then use a data recovery arrangement to take action to recover the missing blocks.

There are at least two ways in which a data recovery arrangement can be arranged to run. That is, either after the end of an initial multicast by a first or selected machine or during that initial multicast. In systems management in which data is downloaded over a larger network to a first or selected machine, the download may run slowly. In this case, the a first or selected machine is likely to have spare capacity for responding to requests for missing portions of data even while it continues to make the initial multicast.

Thus embodiments of the present invention can offer significantly improved efficiency in delivering data and particularly systems management updates in branch office scenarios. Data is only sent once across the larger network to each branch site and (apart from data recovery) data is only sent once over the local network at a branch site to all the local machines.

One further feature is that the use of multicasting allows delivery to be made across subnet boundaries at the branch site, allowing a single download to service the entire branch even if there are many subnets.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2 shows a functional block diagram of processes present on a machine connected to the branch network of FIG. 1;

FIGS. 3 to 6 show schematic views of material being downloaded and multicast by the systems management arrangement of FIG. 1, in different instances of use.

Figure 1:
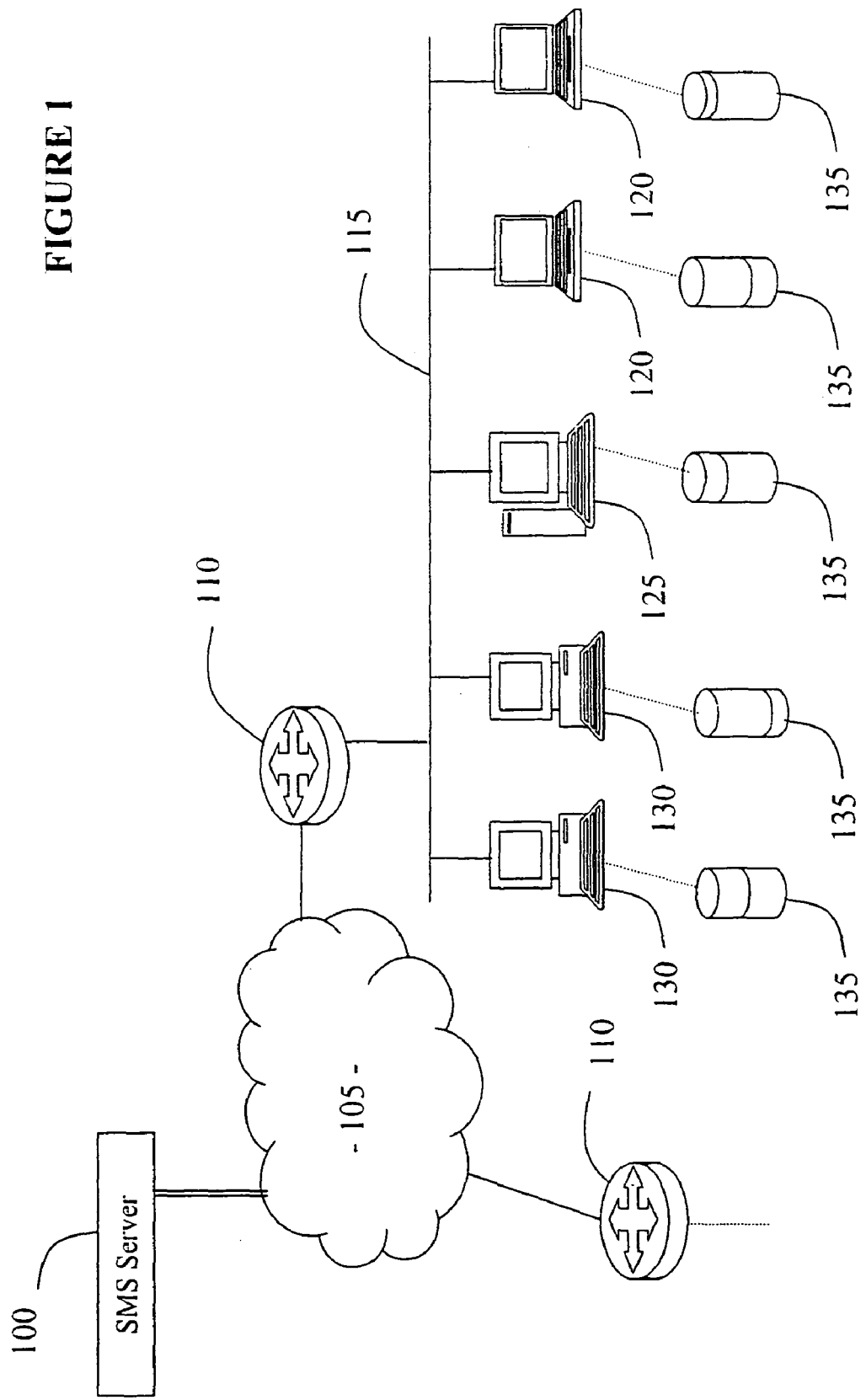
FIG. 1 shows an SMS server connected to a WAN for delivering updates to a branch network.

It might be noted that most of the reference numerals shown in FIG. 3 are omitted from FIGS. 4 to 6. This is for the purpose of clarity only and should not be taken to indicate a difference in the apparatus shown.

OVERVIEW

Referring to FIG. 1, an SMS server 100 is connected to a WAN 105 to which several branch networks 115 are also connected via routers 110. Multiple machines 120, 125, 130 of different types are connected to the branch network 115. Each machine has associated data storage 135 in the usual manner and there may be an additional shared storage resource (not shown), again in known manner.

SMS downloads are delivered from the SMS server 100 over the WAN using an SMSNomad Branch arrangement. When a new update package is available, it is advertised by the SMS server 100 which alerts the machines 120, 125, 130 on the branch network 115. This triggers a selection process at the branch network 115 and causes one of the machines 120, 125, 130 to be elected as an active download master (this election process is described in detail below).

The package is downloaded over the WAN 105 to a local cache data store 135 on the active download master from where it will be multicast over the LAN 115. The cache 135 is a shared data store, such as a shared folder in a conventional data storage system, which means that any one of the other SMSNomad Branch machines 120, 125, 130 can potentially retrieve the download over the LAN 115 for instance in the case they have one or more missing portions. If the elected download master is rebooted or switched off during the download, another machine will be elected as active download master and continue the download from where it was previously interrupted. This new machine also stores the download in a shared cache 135.

The update package will thus be downloaded once over the WAN 105 to a shared cache, and then multicast over the LAN 115 to a group address, thereby making it accessible to all the branch machines 120, 125, 130 relevant to that package.

There are also two mechanisms for achieving download completion at the branch machines 120, 125, 130. It is unlikely that all the branch machines 120, 125, 130 will be switched on and/or capable of receiving the package from start to finish of the time that the active download master branch machine is multicasting it. If a branch machine 120, 125, 130 finds it has missing portions of the package, it can either start to catch up while the active download master is in the process of multicasting the package, or it can perform a fill-in exercise later, when the active download master has stopped multicasting. In either case, the branch machine 120, 125, 130 accesses the shared cache of the active download master, or potentially another branch machine, to retrieve the missing portions and subsequently multicasts them to the group address so that other branch machines have a chance to retrieve the missing portions without having to go back to the active download master.

Referring to FIG. 2, software 200, 205 is installed on each branch machine 120, 125, 130. The software comprises an executable 200 and a service 205. Between them they provide the following functions:

i) a selection mechanism 210 for electing a branch machine to act as active download master;

ii) a WAN download process 215 for downloading an SMS package over the WAN 105 to local storage 135;

iii) a multicast engine 225 for multicasting a downloaded SMS package to the group address over the branch network 115; and iv) a shared cache access facility 220 for copying missing portions of an SMS download and supplying them to the multicast engine 225 such that other branch machines with at least some of the same missing portions can benefit.

1. Advertisement and Download Over the WAN 105

Referring to FIGS. 1 and 3, the systems management arrangement is based on the known use of a SMS server 100 to distribute software over a WAN 105. The branch machines 120, 125, 130 are each equipped as an SMS client. SMS clients are first alerted to a software update by an advertisement, "AD" a shown on FIG. 3, sent by the SMS server 100 and containing the name of the update and/or a description. Branch machines A, B and C as shown on FIG. 3 which are in a connected state on a branch network 115 are thus alerted to the need to download the update. Branch machines D and E are either not connected or down and do not receive "AD" at this stage.

In a conventional SMS arrangement, branch machines A, B and C would then download the update over the WAN 105 from a SMS server 100 acting as their distribution point ("DP"). If the update comprises a program which includes source files, branch machines A, B and C then carry out installation by running the program from the DP 100. This requires the connection to the DP 100 to be maintained until the installation has completed. If the connection between one of the branch machines A, B and C and the DP 100 is lost during an installation, the installation is restarted from the beginning next time the connection is available.

In embodiments of the present invention, the initial process for downloading an update package over the WAN 105 via a router to a selected branch machine 120, 125, 130 on a LAN 115 is the same as that used in the known SMSNomad Branch. This uses a download-and-execute arrangement in which the update package is first downloaded to a cache on a branch machine 120, 125, 130. The branch machine is selected from the available machines A, B and C on the LAN 115 by an election process. The selected machine acts as a "download master" to get the package downloaded from the DP 100 to its cache. Then the installation can be run from the cache once download has completed. The connection to the DP 100 can be dropped after download.

In order to select a machine from the branch machines A, B and C, an election process is run, the machines exchanging election messages "E1" on the LAN 115. This election process is further described under the heading "ELECTION OF A MASTER BRANCH MACHINE" below.

The known SMSNomad Branch will usually be installed on all the branch machines 120, 125, 130. Embodiments of the present invention include SMSNomad Branch but further incorporate multicasting and associated functionality. Referring also to FIG. 2, the systems management arrangement of the present invention is based on SMSNomad Branch and comes in two parts: an executable 200 and a service 205. The executable 200 is run by the branch machine when making SMS downloads over the WAN in the manner of SMSNomad Branch, thus when the branch machine has been elected download master. It performs the actual package download to the download master, handles post download execution and enables bandwidth throttling in relation to the WAN 105. The service 205 meanwhile runs continuously on the branch machines 120, 125, 130. As well as providing the election mechanism and shared cache access of SMSNomad Branch, the service 205 provides multicasting. Thus the service 205 provides an election function 210 for electing a download master, a shared cache access function 220 for completing package downloads locally by file copying from a shared cache, and a multicasting function 225 with local distribution of downloads and file copies by multicasting on the LAN 115.

SMS downloads over the WAN are reliable but data delivery between the branch machines is not. The service 205 which runs during receipt of data blocks of a package from another branch machine by either multicasting or file copying uses a bitmap to mark the current status of each block of the file—either missing or received. The bitmap can be stored in the shared cache 135 of the branch machine 120, 125, 130 or in other available storage. The file is deemed to be complete once all blocks have been received. Thus, if package delivery fails, the service 205 can resume receipt from the point at which it stopped when and from wherever missing data blocks are available. The bitmap data can be used by a branch machine either to ensure complete receipt of a package or in assembling election bids.

The SMSNomad Branch executable 200 runs on the branch machine A, B or C selected as download master during download over the WAN 105. In one arrangement, if the connection is lost, SMSNomad Branch checks the connection every twenty seconds and can resume download as soon as the connection is re-established, even if the download process was partway through a file. If the download master is shut down or goes into standby while the download is in progress, SMSNomad Branch can simply resume when it comes back up or out of standby. In practice, SMSNomad Branch will be closed if the download master is disconnected and shut down. However, it will be restarted by the SMS Advertised Programs Manager when the download master is back up and connected and the download will be restarted at byte level from the point at which it left off.

A preferred option, however, in the case that the download master is switched off or becomes unavailable, is that the election process is repeated automatically and a new download master takes over. Up until the point at which it goes down, the original download master multicasts to the other branch machines at the same time as it is continuing to download a package from the SMS DP 100. The service 205 will have been running on the branch machines 120, 125, 130 receiving the multicast. Each one therefore has compiled a bitmap showing the received status of each block of data of the incoming file at the respective branch machine and can take part in an election. Any machine receiving an update package by multicast will potentially then be able to take over as download master and restart the download from the DP 100 at an appropriate point, taking into account its own position in receiving the update package by multicast.

It is also an option that the election process is repeated when a broken WAN connection to the existing download master is reinstated. A package download over the WAN 105 can take hours or even days and in this time frame it is very possible that another branch machine 120, 125, 130 has become better placed to act as download master.

Referring to FIG. 4, the download process run by the executable 200 starts by copying down the package from the DP 100 to the branch machine which has won the election: "C" as shown in FIG. 4. The transmission path across the WAN 105 to branch machine "C" is shown as "DL" in FIG. 4. This file copying takes place as a background process, so the performance of machine "C" will not be affected. As soon as machine "C" starts to receive the package from the DP 100, it also starts to multicast it, shown as "MC1" in FIG. 4, to a group address on the LAN 115 so that other branch machines to which the package is relevant also start to cache it. Since machines "D" and "E" are either not connected or down, the other branch machines in this instance are "A" and "B".

After the file copy has completed successfully at any of the receiving machines "A", "B" and "C", the actual installation will start. A WAN connection is no longer necessary at this point even for machine "C" as all the installation files are held in the cache of the download master "C".

Known SMSNomad Branch technology provides various housekeeping capabilities in connection with downloads, as follows:

- it can be set to use only a pre-determined percentage of the available bandwidth on the WAN 105, configurable from the SMSNomad Branch command line or a registry on the branch machine
- it contains a back-off algorithm that dynamically adjusts to ensure that other network traffic is given priority. This together with the previous feature eliminate any significant impact on network traffic on the WAN 105 whilst the download to the branch network 115 is taking place
- it ensures that the downloaded package is consistent with the SMS Package source. If the source at DP 100 is changed during the download process, SMSNomad Branch will update the changed files in the cache of the download master automatically
- it allows administrators to specify the maximum package size in accordance with the speed of a relevant network connection. If the package exceeds the threshold for a current connection speed, SMSNomad Branch returns an appropriate status message
- it ensures that there is sufficient disk space on the client to download the package and leave at least three times the package size free before downloading. Insufficient disk space is reported in an SMS status message 2. Election of a Master Branch Machine As mentioned above, an election of a master download machine can be triggered amongst branch machines 120, 125, 130 for various reasons. Elections occur on a per SMS package basis and are called for the following reasons:

- When any SMS Advertisement ("AD") starts having SMSNomad.exe in the program command line.
- When a broken WAN link from the DP 100 to a branch machine 120, 125, 130 is restored
- When a branch machine which is copying a cache from another branch machine 120, 125, 130 notices that the cache source has disappeared.
- At two minute intervals to ensure that only one download master has been elected.

Regarding the last point, the election process is designed such that only one download master is elected at any given moment and it is very unlikely that there will be more. However, under certain circumstances, e.g. testing or maintenance of the system, more than one machine could be elected as download master, and this test is designed to catch such improper elections.

The outcome of an election can be decided using for example the following criteria, which are to be invoked according to an order of precedence set out below:

% caching completed

Current download master (that is, most recently elected)

Time since cache was last verified (A SMS package includes a FileList file which lists all the files in the package, including for example version numbers or latest changes, and dates. At the end of a complete download from the DP 100 or of a multicast, the executable 200 verifies the FileList file directly with the DP 100.)

Disk space

Machine uptime

Machine initiating the election

Machine name, using for example a known string comparison function (this being in order to force an election result if preceding criteria fail to do that)

The election criteria are run by the service 205, use known techniques, and are broadcast by the branch machine when triggering the election request. In one arrangement for example, an election might be carried out using the Universal Data Protocol ("UDP") and a different multicast group address from that used for package delivery. Since such election processes are known, it is not further described herein.

3. Branch Multicast

The multicasting of downloads received over the WAN 105 to other machines over the branch LAN 115 is designed to support efficiency and scalability. This capability can be provided in addition to known SMSNomad Branch mechanisms for sharing the download and is referred to herein as SMSNomad Branch Multicast.

Referring to FIG. 4, while the active download master is downloading the advertised package ("DL"), it multicasts ("MC1") each block of data received to a multicast group specific to the package. Branch machines 120, 125, 130 registered to that group are then able to receive the data and re-assemble the download locally.

Obviously, as a precondition it is necessary that multicast is enabled on the LAN 115, and typically this is realised by enabling Multicast on the routers on the LAN by default. In view of the fact that there is a link from the LAN 115 to the WAN 105, the routers should also be set to prevent the multicast packets from escaping from the LAN 115 onto the WAN 105. This again can be made the default setting for the router.

In one arrangement the SMSNomad Branch Multicast can use Multicast Address Dynamic Client Allocation Protocol (MADCAP) by default to get a range of multicast addresses. MADCAP is a known extension to the Dynamic Host Configuration Protocol (DHCP) protocol standard that is used to support assignment and configuration of Internet Protocol (IP) multicast addresses on Transmission Control Protocol/Internet Protocol (TCP/IP)-based networks.

Ordinarily, DHCP provides client configurations by allocating ranges of unicast IP addresses. A unicast address usually comprises at least two components: a host identity and a network identity. The unicast address is explicitly bound either temporarily or permanently to a specific LAN address recognised by the Media Access Control ("MAC") protocol. The DHCP multicast address, by contrast, has only one component, an address indicating the multicast group, and is mapped automatically at the network interface boards to a MAC address. The Internet Assigned Numbers Authority maintains lists of registered users and assigns numbers. For example, the multicast address 224.0.0.2 is permanently assigned as the address for "All routers on this subnet". Number ranges are also however kept available for assignment to multicast applications and it is these which are relevant to SMSNomad Branch Multicast.

The MADCAP protocol can be used for dynamic allocation of IP multicast addresses on a standard Windows 2003 or 2003 DHCP server. In practice, on a LAN, requests will be forwarded over the WAN 105. For more information about MADCAP and its support in Windows 2000/2003, reference should be made to the DHCP documentation in the Microsoft Windows 2000/2003 TCP/IP Core Networking Guides.

It is also possible to configure SMSNomad Branch Multicast to use a hard-coded multicast address range. This has an advantage in that it can be defined at branch level but it is harder to adapt to accommodate other multicast users of the network.

It is to be noted that all of this is almost transparent to the Microsoft SMS 100: once the software has been installed on the branch machines 120, 125, 130, all that is required at the SMS server 100 is the addition of the word SMSNomad to the command-line of the SMS programs.

4. Download Completion: Active, Catchup and Fill-In

In general, when data is transmitted, some of it will be lost or corrupted. A simple way of checking received data and providing a degree of resilience in multicasting is to use a known Cyclic Redundancy Check ("CRC") process. For example, each of the twenty four packets of data in a 32 k block multicast by a download master will include a bit which indicates odd or even parity. If a packet is missing or corrupted, the parity bits viewed in sequence will usually show an error and a missing packet can then be regenerated at the receiving end. However, this is not sufficient to regenerate larger amounts of missing data.

In practice, it is unlikely that all branch machines 120, 125, 130 are going to be online and able to receive the whole of a SMS package at the time of its download by the elected download master. This can lead to significant portions of a download being missing, and these cannot be regenerated at the receiving end. There are therefore two mechanisms for allowing machines to obtain missing portions of a download: catch-up and fill-in. (These are further described below.) Both of these mechanisms result in additional multicasting on the branch network 115. Thus there are in all three types of multicast packet which will be received over the LAN 115: "active packets" which are multicast by the active download master as it receives them over the WAN 105; "catch-up packets" which are multicast by a branch machine which is obtaining missing portions of a download by accessing a shared cache while the original download is still taking place over the WAN 105; and "fill-in packets" which are multicast by a branch machine which is obtaining missing portions of a download by accessing a shared cache after the original download has finished. These packets are identified according to type by flag bits in the header bytes of each packet.

Active packets are dealt with as generally described above and will simply be multicast on receipt. There are constraints however on the use of catch-up and fill-in. In catch-up, the branch machines 120, 125, 130 are already receiving and processing multicast active packets. The catch-up mechanism imposes an additional load on one of the branch machines which potentially affects its performance. The catch-up mechanism therefore includes the constraint that the branch machine performing catch-up is changed at intervals. The fill-in mechanism is barred from taking place during the original download but can be done by a single machine after the original download has finished without affecting its performance significantly because it will no longer be receiving and processing multicast active packets.

4.1 Catch-Up

Referring to FIG. 5, each block of a downloaded package is labelled according to its location in the download so that the download can be re-assembled at the destination in the correct order. This also has the benefit of allowing branch machines that join the multicast group later, at some time after the initial broadcast has been started, to request the earlier parts of the download they may have missed. This catch-up request is handled through the normal SMSNomad Branch download share mechanism using the shared cache access function 220 of the service 205. The first machine to start a catch-up request then re-multicasts each catch-up block it retrieves, on the basis that there may be other machines that have joined the multicast group late. Only the data that is required for catch-up is re-broadcast to the multicast group.

In FIG. 5, branch machine "D" which was previously switched off or down has come back on line. It has received the current advertisement "AD" from the SMS server 100 and consequently triggered an election process ("E2") amongst the active branch machines 120, 125, 130 "A" to "D". Machine "C" has remained the active download master since it has already received a significant part of the download and machine "D" has therefore joined the current multicast client group. However, as it starts to receive active, labelled blocks of the download, branch machine "D" can recognise that it has not received the earlier portion of the download and it needs to take part in a catch-up process.

It is preferred to have only one machine running a catch-up process at any one time, and there might, of course, already be a machine running a catch-up process at the time that machine "D" comes back online. There are two ways machine "D" can find this out. Any given branch machine 120, 125, 130 can be arranged to notify other machines, as part of the election process, that it is running a catch-up process, or machine "D" can monitor the group address for incoming packets of the type "catch-up".

If there is no machine currently running a catch-up process, machine "D" will do so. Whilst remaining in the multicast group and therefore continuing to receive the later part of the download, machine "D" therefore connects to the cache of the current download master machine "C" to obtain the missing portion "MP1".

The known mechanism of SMSNomad Branch is used in the catch-up process, which involves creating a local user account "SMSNomadP2P&". This account is not a domain user and does not have the "Log on locally" privilege. The SMSNomad Branch cache of the download master machine "C" is shared as "NomadShr", giving accounts "SMSNomadP2P&" and "Users" read access. This allows for new connections to be established using the SMSNomadP2P& account and also allows access to the cache for machines with existing connections. In use of SMSNomad Branch in the past, a user limit was set to six concurrent connections to avoid reaching a connection limit for machine "C".

In SMSNomad Branch Multicast, when the missing portions of the download are received at Machine "D", they are delivered to two locations: firstly to the NomadShr cache to be added to the SMS download at machine "D" and secondly to the remulticast function 225. These missing portions are then remulticast to the same group address as before ("MC2"), this time identified as "catch-up" packets.

Thus in the known SMSNomad Branch process there was no multicasting and many client branch machines 120, 125, 130 would need to connect to the SMSNomad cache folder of an elected download master machine in order to copy SMS package source code. In contrast, in SMSNomad Branch Multicast, the primary form of distribution to the client branch machines 120, 125, 130 is multicasting and the file share mechanism is only used for catch-up or fill-in purposes, so the impact on the elected download master machine is much less. Even with the limit of six concurrent connections, SMSNomad Branch could have the effect of overloading and slowing the branch machine providing file sharing. In a multicast embodiment according to the present invention, only one machine need connect to the branch machine providing file sharing at a time. There is much reduced demand for file sharing since catch-up and fill-in material is automatically remulticast. This means that most of the branch machines will receive at least most of an SMS package by multicast and will not require to file-share at all, or at worst, only for short periods.

While the download "DL" is still taking place, the WAN 105 connection limits the bandwidth and speed available to the download. If the package being downloaded is large, a successful download can even take days. All the same, because the branch machines 120, 125, 130 are already receiving active packets, running the catch-up process potentially affects performance. It is therefore preferred to limit the rate at which catch-up packets are retrieved and multicast. It is also preferred to cycle the process around the branch machines 120, 125, 130, ensuring as many as possible of the active packets have been copied in locations accessible over the LAN 115 but without risking too high or too long a degradation in performance of any one machine. For example, any machine running a catch-up process may be set to back-off after receiving a fixed number of data blocks, such as forty blocks, allowing another branch machine to start its catch-up process. This back-off mechanism is provided by a rate limiting process in the multicasting function 225 of the service 205.

4.2 Fill-In

The above describes a catch-up process which runs if a machine 120, 125, 130 recognises it has missing portions of a download while the download "DL" is still taking place. It may be the case that a machine 120, 125, 130 comes back online after the download has finished but while the advertisement "AD" is still current. The fill-in process will be run in this case.

It might be noted that an advertisement "AD" in SMS known data distribution arrangements can be set to have an expiry date/time, after which the advertisement is no longer current and will not be processed further. Since downloading and caching potentially take a long time, the expiry date is checked before the setup command line is actually run by a machine preparing to download.

Referring to FIG. 6, a branch machine "E" has come online after a download "DL" has completed but while the advertisement "AD" is still current. "E" triggers an election E3 amongst the branch machines 120, 125, 130 for a download master. At this point machine "A" has gone offline so does not take part in the election, and none of the machines is currently transmitting SMSNomad packets on the LAN 115. Accordingly, the result of the election process is that Machine "D" is elected as download master and machine "E" accesses the shared SMSNomad cache of machine "D" in order to download the package. Packets subsequently downloaded by "E" are remulticast ("MC3"), identified as "fill-in" packets. If another machine were now to come online, the fill-in packets would prevent the triggering of an election as it is preferred that only one machine runs a fill-in process at a time.

When machine "E" has finished copying a package from the machine "D" cache, the SMSNomad Branch executable verifies the FileList file directly with the DP 100. This is the same process mentioned above which is run by every branch machine on completing receipt of a SMS package. It may be that, although machine "D" had the most up to date copy amongst the branch machines taking part in the election triggered by machine "E", the copy of the package held by machine "D" was out of date. In this instance, machine "E" will now download changed files directly from the DP 100. There are two options at this stage: Machine "E" can multicast these changed files as a fill-in process, or machine "E" may simply be left to win any future election.

To summarise the description above, the following three sub-types of packet might be multicast on the LAN 115:

"Active Packets": these are packets that are sent on as they are copied from the SMS distribution point 100 (over the WAN 105). The workrate and the WAN speed mean that these will be transmitted relatively slowly. Only the elected download master machine will ever transmit these packets.

"Catch-Up Packets": these are only transmitted during the period when the download master machine is actively caching from the distribution point DP 100. Thus during transmission of catch-up packets, two machines are independently multicasting, the download master and a branch machine running a catch-up process. The catch-up process ensures that as much of the SMS package as possible will be available in the event that the active download master machine is switched off whilst in the process of caching the package. As mentioned above, the branch machines 120, 125, 130 take turns to run the catch-up process and only a set number of catch-up blocks, such as forty, are transmitted on the LAN 115 in each turn.

"Fill-In Packets": these packets are transmitted when data is copied by any branch machine 120, 125, 130 (from the current download master machine) over the LAN 115 after the SMS package has been completely cached by the master. These packets "fill-in" any gaps due to missed packets in the original multicast. They are also used for parts of the package missed at the start of the session. Logic is included to ensure that only one machine will be transmitting fill-in packets at any time and a fill-in process will cease immediately if any "Active Packets" are detected on the LAN 115.

5. Configuration and Running

Both the SMSNomad Branch executable and service are installed on each of the branch machines 120, 125, 130. SMSNomad Branch is designed to integrate completely with Microsoft's SMS Advertised Program Management (APM). To install software to clients using SMSNomad Branch, the administrator simply creates a program in the SMS package to run SMSNomad Branch. This program is followed by the normal command line to invoke the software installation.

For example, if the normal command line to invoke the software installation is:

setup.exe-s—SMS then the administrator would create a program in the SMS package, which program has the command line:

SMSNomad.exe setup.exe-s—SMS

To start a download process to deliver the SMS package to branch machines 120, 125, 130, the SMSNomad Branch modified program is advertised in the usual way, and assigned to a target set of client machines. When the branch machines 120, 125, 130, acting as SMS clients in this context, receive the advertisement, the SMSNomad Branch service triggers an election for a download master. The elected download master downloads the package from the distribution point to a local cache directory. Each package comprises a set of files and a command line that needs to be run to perform the installation. The command line is changed by adding SMSNomad.exe to the front of the original command line of the SMS package. The client machine downloads the files and then runs the command line (in the folder containing the files). Once the files have been cached, the SMSNomad Branch executable then executes the original command line.

The above enables use of SMSNomad Branch in delivering an SMS package but more must be done to configure use of SMSNomad Branch Multicast. SMSNomad Branch Multicast can be used in different ways. In particular, either a catch-up or a fill-in technique can be used in completing downloads but which is to be used needs to be configured. To do this, as well as adding SMSNomad.exe to the normal command line, a command-line switch is added to the SMS program command-line. The following table shows the settings for this multicast switch:

TABLE 1

| Switch | Value | Description |
| --- | --- | --- |
| --mc | 0 | Non-multicast mode (the default mode) |
| --mc | 1 | Sets the multicast technique as a fill-in technique, taking place only after the initial download multicast has finished. |
| --mc | 2 | Reserved value - no user-oriented use |
| --mc | 3 | Sets the multicast technique as a catch-up technique, taking place during the active part of the initial download multicast |

The criterion for selecting between use of a catch-up or a fill-in technique is simply that catch-up is selected if there are still active packets being transmitted on the LAN 115. If there are active packets, this means that a branch machine is still downloading from the WAN 105. Once any one machine has 100% of a package, active packets will no longer be travelling on the LAN 115 and a fill-in technique will be selected thereafter.

A house-keeping aspect of using SMS packages cached on local machines is that disk space can become restricted. It is possible to install a cache cleaning process designed to optimise use of cache space when the SMSNomad Branch service is enabled. Such a system is already known for use with the SMSNomad Branch service and cache cleaning is not therefore described further here.

In the embodiment of the invention described above, data is first downloaded over a network (a WAN 105 in the foregoing example), and then multicast over a different network (a LAN 115 in the example). However, embodiments of the invention might be found useful in other environments for distributing data amongst networked machines. For example, an embodiment of the invention might be used to distribute material to several machines in a domestic environment. It is not essential that the material has been received over a network such as a WAN in this environment. It could instead be installed on one of the networked machines from a compact disc or a DVD and then multicast by that machine as download master. Such a machine would necessarily win an election process at first instance since it would be the only machine having the material in its shared data storage.

The invention claimed is:

1. A systems management computer, comprising:

a processor configured to execute a set of stored instructions that implements a method for receiving data from a server over a first network and for distributing the data to a plurality of computers over a second network, the set of instructions including instructions which in operation:
- elect, by a selection mechanism, a computer from said plurality of computers of the second network to act as an active download master computer;
- initiate, by a download process, downloading of data over the first network to local data storage when the computer is elected as the active download master computer; and
- multicast, by a multicast distribution engine, the downloaded data over the second network to other computers of the second network when the computer is elected as the active download master computer.

2. A systems management computer according to claim 1, wherein the elected computer is elected on the basis of completeness of the sets of data held by computers of said plurality.

3. A systems management computer according to claim 1, wherein the elected computer is elected on the basis of currency of the sets of data held by computers of said plurality.

4. A systems management computer according to claim 1, wherein the elected computer is elected on the basis of whether a computer of said plurality is in the course of multicasting a set of data.

5. A network comprising a plurality of systems management computers, each according to claim 1, wherein each computer further comprises a shared cache access facility for copying missing portions of a download and wherein the set of instructions includes further instructions which, in operation, multicast the missing portions to others of the plurality of computers of the second network.

6. A systems management computer, comprising:
a processor configured to execute a set of stored instructions that implements a method for receiving data from a server over a first network and for distributing the data to a plurality of computers over a different second network, the set of instructions including instructions which in operation:
- elect, by a selection mechanism, a computer from said plurality of computers of the second network to act as an active download master computer;
- initiate, by a download process, downloading of data over the first network to local data storage when the computer is elected as the active download master computer; and
- multicast, by a multicast distribution engine, the downloaded data over the second network to other computers of the second network when the computer is elected as the active download master computer.

7. A systems management computer according to claim 6, wherein the elected computer is elected on the basis of completeness of the sets of data held by computers of said plurality.

8. A systems management apparatus computer according to claim 6, wherein the elected computer is elected on the basis of currency of the sets of data held by computers of said plurality.

9. A systems management computer according to claim 6, wherein the elected computer is elected on the basis of whether a computer of said plurality is in the course of multicasting a set of data.

10. A network comprising a plurality of systems management computers, each according to claim 6, wherein each computer further comprises a shared cache access facility for copying missing portions of a download and wherein the set of instructions includes further instructions which, in operation, multicast the missing portions to others of the plurality of computers of the second network.

11. A systems management computer, comprising:
a processor configured to execute a set of stored instructions that implements a method for receiving data from a server over a first network and for distributing the data to a plurality of computers over a different second network, the set of instructions including instructions which in operation:
- elect, by a selection mechanism, a computer from said plurality of computers of the second network to act as an active download master computer;
- initiate, by a download process, downloading of data over the first network to local data storage when the computer is elected as the active download master computer;
- multicast, by a multicast distribution engine, the downloaded data over the second network to other computers of the second network when the computer is elected as the active download master computer; and
- detect, by a multicast cessation detector, a cessation in receipt of multicast data by a first computer in the second network, and trigger said election in the event of the detected cessation.

12. A systems management computer according to claim 11, wherein the elected computer is elected on the basis of completeness of the sets of data held by computers of said plurality.

13. A systems management computer according to claim 11, wherein the elected computer is elected on the basis of currency of the sets of data held by computers of said plurality.

14. A systems management computer according to claim 11, wherein the elected computer is elected on the basis of whether a computer of said plurality is in the course of multicasting a set of data.

15. A network comprising a plurality of systems management computers, each according to claim 11, wherein each computer further comprises a shared cache access facility for copying missing portions of a download and wherein the set of instructions includes further instructions which, in operation, multicast the missing portions to others of the plurality of computers of the second network.

16. A systems management computer, comprising:
a processor configured to execute a set of stored instructions that implements a method for receiving data from a server over a first network and for distributing the data to a plurality of computers over a different second network, the set of instructions including instructions which in operation:
- elect a computer from said plurality of computers of the second network to act as an active download master computer;
- initiate downloading of data over the first network to local data storage when the computer is elected as the active download master computer;
- multicast, by a multicast distribution engine, the downloaded data over the second network to other computers of the second network when the computer is elected as the active download master computer; and
- detect, by a link detector, restoration of a link to the computer elected as the active download master computer of said plurality of computers in the second network, and trigger said election in the event of the detected restored link.

17. A systems management computer according to claim 16, wherein the elected computer is elected on the basis of completeness of the sets of data held by computers of said plurality.

18. A systems management computer according to claim 16, wherein the elected computer is elected on the basis of currency of the sets of data held by computers of said plurality.

19. A systems management computer according to claim 16, wherein the elected computer on the basis of whether a computer of said plurality is in the course of multicasting a set of data.

20. A network comprising a plurality of systems management computers, each according to claim 16, wherein each computer further comprises a shared cache access facility for copying missing portions of a download and wherein the set of instructions includes further instructions which, in operation, multicast the missing portions to others of the plurality of computers of the second network.

21. A non-transitory computer-readable storage medium having instructions stored thereon, for execution by a computer, that implements a method for receiving data from a server over a first network and for distributing the data to a plurality of computers over a second network, the instructions comprising:
  electing a computer from said plurality of computers to act as an active download master computer;
  initiating a download process, operable on the elected computer, for downloading data from a server over the first network to data storage on the elected computer acting as the download master computer; and
  multicasting the downloaded data from the elected computer acting as the download master computer over the second network to other computers of said plurality of computers of the second network.

22. The non-transitory computer-readable storage medium according to claim 21, wherein the instructions further comprise detecting a cessation in receipt of multicast data by a computer of said plurality of computers of the second network, and triggering said electing in the event of a detected cessation.

23. The non-transitory computer-readable storage medium according to claim 21, wherein the instructions further comprise detecting a restoration of a link to a computer of said plurality of computers of the second network, and triggering said electing in the event of a detected restored link.

24. The non-transitory computer-readable storage medium according to claim 21, wherein said electing is based on completeness of the sets of data held by computers of said plurality of computers of the second network.

25. The non-transitory computer-readable storage medium according to claim 21, wherein said electing is based on currency of the sets of data held by computers of said plurality of computers of the second network.

26. The non-transitory computer-readable storage medium according to claim 21, wherein said electing is based on whether a computer of said plurality of computers of the second network is in the course of multicasting a set of data.

27. The non-transitory computer-readable storage medium according to claim 21, wherein the instructions further comprise copying missing portions of a download, using a shared cache access facility, and multicasting the missing portions to the other computers of the second network.

28. A computer-based method for receiving data from a server over a first network and for distributing the data to a plurality of computers over a second network, comprising:
  electing a computer from said plurality of computers to act as an active download master;
  downloading data from the server over the first network to local data storage of the active download master computer; and
  multicasting, at the active download master computer, the downloaded data over the second network to other computers of the second network.

29. The computer-based method according to claim 28, further comprising, at the server, sending a new data alert to the plurality of the computers in the second network, and, at the plurality of computers, triggering the election by the alert received from the server.

30. The computer based method according to claim 28, wherein the local data storage is a cache shared by the computers of the second network.

* * * * *